(12) United States Patent
Evers et al.

(10) Patent No.: US 11,463,555 B2
(45) Date of Patent: Oct. 4, 2022

(54) LOCAL INTERCONNECT NETWORK (LIN) MESSAGING BETWEEN LIN PARTITIONS SEPARATED BY A BACKBONE COMMUNICATION NETWORK

(71) Applicant: NXP B.V., Eindhoven (NL)

(72) Inventors: Rainer Evers, Hamburg (DE); Donald Robert Pannell, Cupertino, CA (US)

(73) Assignee: NXP B.V., Eindhoven (NL)

( * ) Notice: Subject to any disclaimer, the term of this patent is extended or adjusted under 35 U.S.C. 154(b) by 149 days.

(21) Appl. No.: 16/984,593

(22) Filed: Aug. 4, 2020

(65) Prior Publication Data
US 2022/0046108 A1  Feb. 10, 2022

(51) Int. Cl.
*H04L 67/62* (2022.01)
*H04L 12/40* (2006.01)
*H04L 67/1097* (2022.01)
*H04L 67/566* (2022.01)
*H04L 12/46* (2006.01)
*H04L 67/146* (2022.01)

(52) U.S. Cl.
CPC ........ *H04L 67/62* (2022.05); *H04L 12/40032* (2013.01); *H04L 67/1097* (2013.01); *H04L 67/566* (2022.05); *H04L 2012/40234* (2013.01)

(58) Field of Classification Search
CPC ... H04L 67/32; H04L 67/325; H04L 67/1097; H04L 67/2833; H04L 12/40032; H04L 12/40006; H04L 2012/40234; H04L 2012/40208
See application file for complete search history.

(56) References Cited

U.S. PATENT DOCUMENTS

| | | | |
|---|---|---|---|
| 8,200,700 B2 * | 6/2012 | Moore | G06F 16/27 707/791 |
| 8,347,088 B2 * | 1/2013 | Moore | G16Z 99/00 726/2 |
| 2003/0070019 A1 * | 4/2003 | Dalakuras | H04L 12/40156 710/110 |
| 2004/0003153 A1 * | 1/2004 | Froeschl | H04L 12/40169 710/104 |
| 2004/0117537 A1 * | 6/2004 | Marcel Vandensande | H04L 12/40032 710/305 |
| 2006/0120390 A1 | 6/2006 | Habben et al. | |
| 2007/0268991 A1 * | 11/2007 | Watkins | H04L 69/323 375/356 |

(Continued)

OTHER PUBLICATIONS

Peak System, "PCAN-LIN, Interface for LIN, CAN, and RS-232, User Manual," Document version 2.3.0, Mar. 22, 2019, 34 pages.

(Continued)

*Primary Examiner* — Jenee Holland

(57) ABSTRACT

A proxy slave in a first LIN partition receives data from a proxy master in the second LIN partition which in turn receives the data from a slave in the second LIN partition. The proxy slave stores the data in a data structure and receives a read request from an originating master in the first LIN partition after the data is stored. The read request comprises a LIN message identifier subscribed to by the slave in the second LIN partition. The proxy slave accesses the data stored in the data structure based on the LIN message identifier in the read request; and sends a LIN response to the originating master with the stored data from the slave in the second LIN partition.

24 Claims, 8 Drawing Sheets

(56) References Cited

U.S. PATENT DOCUMENTS

| | | | | |
|---|---|---|---|---|
| 2007/0291887 | A1* | 12/2007 | Ishimoto | H04L 25/40 |
| | | | | 375/371 |
| 2009/0172242 | A1* | 7/2009 | Piasecki | G06F 13/4208 |
| | | | | 710/110 |
| 2009/0243655 | A1* | 10/2009 | Nascimento | G06F 13/4072 |
| | | | | 326/83 |
| 2010/0082198 | A1* | 4/2010 | Arai | H02J 7/0032 |
| | | | | 701/31.4 |
| 2011/0271132 | A1* | 11/2011 | Merey-Marzat | |
| | | | | H04L 12/40039 |
| | | | | 713/323 |
| 2013/0274897 | A1* | 10/2013 | Herthan | H04L 12/4625 |
| | | | | 700/3 |
| 2013/0311691 | A1* | 11/2013 | Barrenscheen | G06F 13/404 |
| | | | | 710/110 |
| 2014/0084081 | A1* | 3/2014 | Kunz | E01H 3/02 |
| | | | | 239/172 |
| 2014/0372647 | A1* | 12/2014 | Evers | G06F 13/362 |
| | | | | 710/110 |
| 2015/0008732 | A1 | 1/2015 | Fujimoto | |
| 2015/0169481 | A1* | 6/2015 | Harres | G06F 13/364 |
| | | | | 710/110 |
| 2015/0335523 | A1* | 11/2015 | Kang | G16H 20/30 |
| | | | | 4/541.1 |
| 2015/0356043 | A1* | 12/2015 | Hasse | G06F 13/4022 |
| | | | | 710/110 |
| 2015/0381765 | A1* | 12/2015 | Hasse | H04L 67/125 |
| | | | | 709/208 |
| 2016/0134553 | A1* | 5/2016 | Kim | H04L 43/0811 |
| | | | | 370/254 |
| 2017/0077853 | A1* | 3/2017 | Zook | H02P 9/48 |
| 2017/0201584 | A1* | 7/2017 | Endo | B60R 16/023 |
| 2017/0359195 | A1* | 12/2017 | Bender | H04L 12/40006 |
| 2019/0095371 | A1* | 3/2019 | Yoshino | H04L 12/40019 |
| 2019/0138934 | A1* | 5/2019 | Prakash | G06K 9/6257 |
| 2019/0165968 | A1* | 5/2019 | Nakajima | H04L 12/403 |
| 2019/0220703 | A1* | 7/2019 | Prakash | G06F 15/16 |
| 2019/0258251 | A1 | 8/2019 | Ditty et al. | |
| 2019/0361696 | A1* | 11/2019 | Nakano | G06F 8/654 |
| 2020/0090808 | A1* | 3/2020 | Carroll | A61B 18/1206 |
| 2020/0106220 | A1* | 4/2020 | Henderson | H01R 13/703 |
| 2020/0136858 | A1* | 4/2020 | Rotti | H04L 63/0464 |
| 2020/0234495 | A1* | 7/2020 | Nakao | G06T 19/00 |
| 2022/0046108 | A1* | 2/2022 | Evers | H04L 12/40032 |
| 2022/0059977 | A1* | 2/2022 | Zaderej | H05K 3/341 |

OTHER PUBLICATIONS

Peak System, "PCAN-Ethernet Gateway DR, CAN to LAN Gateway in DIN rail plastic casing, User Manual," Document version 1.7.0, Jul. 31, 2019, 66 pages.

IEEE Standard Association, "IEEE Standard for a Transport Protocol for Time-Sensitive Applications in Bridged Local Area Networks," downloaded Jul. 21, 2020 from https://ieeexplore.ieee.org/stamp/stamp.jsp?tp=&arnumber=7782716, 233 pages.

* cited by examiner

LOCAL INTERCONNECT NETWORK (LIN) MESSAGING BETWEEN LIN PARTITIONS SEPARATED BY A BACKBONE COMMUNICATION NETWORK

FIELD OF USE

This disclosure generally relates to local interconnect networks (LINs), and more particularly to LIN messaging between LIN partitions separated by a backbone communication network.

BACKGROUND

Local Interconnect Network (LIN) standard is often used in automotive and industrial automation applications. The LIN standard is described in International Standard Organization (ISO) 17987 and prior specification from the LIN Consortium and defines low-end multiplex network solutions having a single master and multiple slaves. Communications between the single master and the multiple slaves is via a single-wire with bit rates up to 20 kbit/s.

A LIN is used in various environments such as in a vehicle. For example, each slave of the LIN communicates information associated with vehicle operation to the master via the LIN. The LIN especially as used in the vehicle is converging to a zonal architecture comprising multiple zones where a master and one or more slaves coupled together via the single-wire defines a zone or LIN partition. Further, LIN partitions are coupled by a high data rate backbone communication network such as Ethernet to form a divided LIN network. The LIN standard requires that a transaction such as a read request between a master in the first LIN partition and a slave in the second LIN partition over the high data rate backbone communication network occur within a LIN response time. The LIN response time may be a predefined time for providing a response to the read request.

Figure 1:
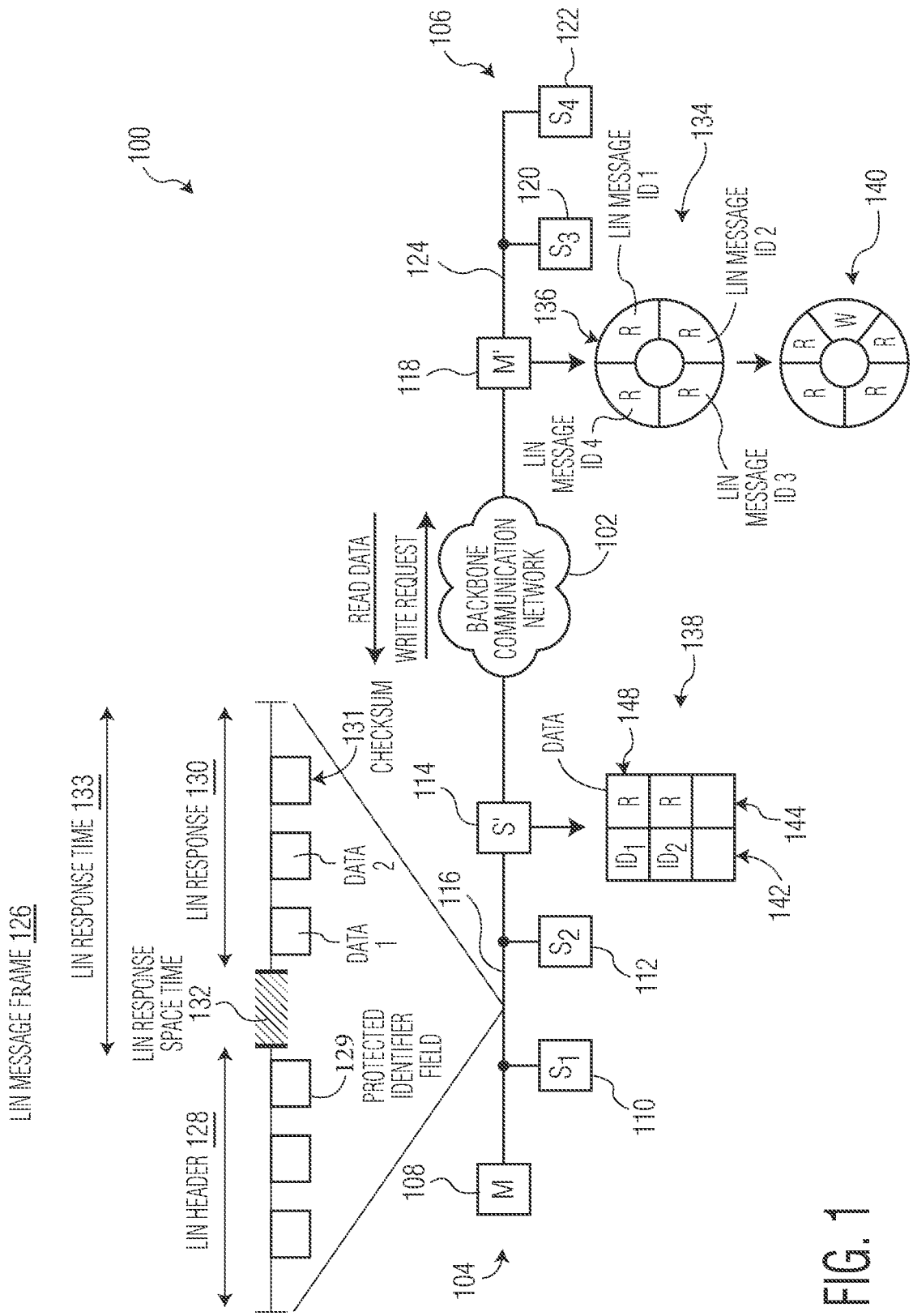
FIG. 1 is an example system diagram of a divided Local Interconnect Network (LIN) which is split via a backbone communication network into different LIN partitions and configured to support read requests and write requests.

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows that embody aspects of Local Interconnect Network (LIN) messaging between LIN partitions to reduce violation of LIN response space time in LIN frames. Well known instructions, protocols, structures, and techniques have not been shown in detail in order not to obfuscate the description.

Overview

An originating master in first LIN partition sends a read request with a LIN message identifier subscribed to by a slave in a second LIN partition. A proxy slave in the first LIN partition receives the read request and forwards the read request over a high speed backbone network to a proxy master in the second LIN partition. In response, the proxy master sends the read request to one or more slaves in the second LIN partition and a slave in the second LIN partition provides a response to the proxy master with the data to be read. The proxy master provides the response to the proxy slave over the backbone network, and the proxy slave provides the response to the originating master. Communication between the originating master and the slave in the second LIN partition typically violates a LIN response time such as a maximum LIN response time which is an expected time that the originating master expects the response. The violation is due to an added latency of sending the request and response through the high speed backbone network.

Various embodiments disclosed herein are directed to LIN messaging between LIN partitions to reduce or prevent violation of the LIN response time of LIN messaging frames. To reduce or prevent this violation, the proxy slave of first LIN partition receives and stores a copy of the data received from one or more slaves in the second LIN partition before a read request is received from the originating master in the first LIN partition. This way the proxy slave does not need to obtain from the slave in the second LIN partition the data to be read when the read request is received from the originating master. Instead, the proxy slave responsively provides the data to the read request within the LIN response time. To facilitate the proxy slave storing the copy of the data associated with the slave in the second LIN partition, the proxy master in the second LIN partition has a basic read schedule table (BRST). In examples, the BRST is a data structure such as an array or linked list. Each entry in the BRST indicates a LIN message identifier subscribed to by a slave to read data from the slave. For example, the proxy master reads the data indicated by the BRST by sending a read request in the second LIN partition with a LIN message identifier and a slave in the second LIN partition which subscribes to the LIN message identifier sends a LIN response with the read data. As another example, the proxy master sends an Event Triggered Frame (ETF) with a LIN message identifier to read data from one or more slaves in the second LIN partition which subscribes to the LIN message identifier. The proxy master in the second LIN partition has an event triggered schedule table (ETST) which is a data structure such as an array or linked list with the ETF. If no slave in the second LIN partition which subscribes to the ETF has the data, then no slave in the second LIN partition sends a LIN response, which causes a LIN response timeout, which is acceptable for ETF. If one slave in the second LIN partition subscribes to the ETF and has the data, then the one slave in the second LIN partition sends the LIN response with the read data. If more than one slave in the second LIN partition subscribes to the ETF and has the data, then the more than one slave in the second LIN partition sends a respective LIN response which collide. The ETST may additionally include collision resolving read slots for reading data from the one or more slaves in the second LIN partition one at time when there is a collision. In each example, the proxy master may always forward, forward only after data changes, or some other criteria the read data from a slave in the second LIN partition via the backbone communication network to the proxy slave. In this manner, the proxy slave stores a copy of the data which was received from the slave in the second LIN partition. Then, if the originating master on the first LIN partition sends a read request or ETF with a LIN message identifier subscribed to by a slave in the second LIN partition, the proxy slave provides the data associated with the slave in the second LIN partition. The BRST or ETST result in the proxy master anticipatorily reading the data from the slave in the second LIN partition and providing the data to the proxy slave. Further, when the originating master in the first LIN partition sends a read request or ETF for data stored by a slave in the second LIN partition, the originating master in the first LIN partition receives the data from the proxy slave within the LIN response time.

Example System

FIG. 1 is a system diagram of a divided LIN 100 which is split via a backbone communication network 102 into different LIN partitions and configured to support read requests and write requests. The LIN standard is described in International Standard Organization (ISO) 17987 and prior specification from the LIN Consortium and defines a master/slave model of communication where a master device controls one or more slave devices. The divided LIN 100 has a first LIN partition 104 and a second LIN partition 106. The first LIN partition 104 has an originating master 108 and zero, one, or more than one slaves shown as slaves 110, 112 coupled together via a data path 116. Further, the first LIN partition 104 and the second LIN partition 106 are coupled by the backbone communication network 102. The backbone communication network 102 may take the form of an Ethernet protocol network or some other type of data network which tunnels messages between the LIN partitions. In examples, a proxy slave 114 of the first LIN partition 104 and a proxy master 118 in the second LIN partition 106 may be coupled to the backbone communication network 102. Further, the proxy master 118 may be coupled to one or more other slaves 120, 122 via a data path 124. The proxy slave 114 in the first LIN partition 104 is a proxy to the other slaves 120, 122 in the second LIN partition 106. For example, as described herein, the proxy slave 114 may store data on the slaves in the second LIN partition 106. Further, the proxy master 118 in the second LIN partition 106 is a proxy to the originating master 108 in the first LIN partition 104. For example, as described herein, the proxy master 118 may perform requests to read data from the slaves in the second LIN partition 106 and write data to the slaves in the second LIN partition 106 in accordance with the read and write requests performed by the originating master 108.

One or both of the masters 108, 118 may be implemented using circuitry such as analog circuitry, mix signal circuitry, memory circuitry, logic circuitry, processing circuitry that executes code stored in a memory that when executed by the processing circuitry perform the disclosed functions, or combinations thereof. One or both of the proxy slave 114 and slaves may be implemented using circuitry such as analog circuitry, mix signal circuitry, memory circuitry, logic circuitry, processing circuitry that executes code stored in a memory that when executed by the processing circuitry perform the disclosed functions, or combinations thereof. The divided LIN 100 shown in FIG. 1 is arranged with two LIN partitions 104, 106, but in other examples, the divided LIN 100 may have more than two LIN partitions such as a third partition coupled the first LIN partition or the second LIN partition via the backbone communication network 102. The third partition (and other additional partitions) may have a respective proxy master to the originating master 108 in the first LIN partition 104. Other variations are also possible.

The slaves may provide data. The data may be generated by a slave itself and stored in the slave or be received from the originating master 108 and stored in the slave. In examples, the originating master 108 may initiate a write request in order for the originating master 108 to store the data in the slave. The write request may take the form of a LIN message frame 126. The LIN message frame 126 comprises a LIN header 128 and a LIN response 130. The originating master 108 sends the LIN header 128 and the LIN response 130 as part of the write request. The LIN header 128 includes various fields including a protected identifier (PID) field 129 having a LIN message identifier. The LIN message identifier may identify a certain type of data to write and slaves which subscribe to the LIN message identifier may write the data of the write request. A slave which receives the LIN header 128 uses the LIN message identifier to determine whether the slave is to perform a write operation. If the slave subscribes to the LIN message identifier, then the slave stores the data provided in the LIN response 130 of the LIN message frame 126 which is subsequently sent by the originating master 108 after a period of time referred to as a LIN response space time 132. In order for the originating master 108 to read the data from a slave, the originating master 108 may perform a read request. The read request may be based on the LIN message frame 126 with a LIN message identifier which indicates a read request. The originating master 108 may send the LIN header 128 to a slave and then the slave which receives the LIN header 128 uses the LIN message identifier to determine whether the slave is to perform the read request. If the slave subscribes to the LIN message identifier, then the slave sends the LIN response 130 with the data. The LIN response 130 is to be provided to the originating master 108 within a LIN response time 133 which is an aggregation of a time of the LIN response 130 and the LIN response space time 132. In examples, the LIN header 128 and the LIN response 130 define a LIN message frame 126 and the LIN response 130 may have a checksum 131 to detect errors in the LIN response 130.

The originating master 108 typically sends a read request or write request associated with a slave in the second LIN partition 106. The proxy slave 114 and the proxy master 118 may facilitate communication of the read request or write request from the originating master 108 to the slave in the second LIN partition 106. The proxy slave 114 may be arranged to send the LIN header 128 of the read request to the proxy master 118 or the LIN header 128 and the LIN response 130 of the write request to the proxy master 118. If the backbone communication network 102 is an Ethernet network, then the proxy slave 114 may form an Ethernet frame destined to the proxy master 118 in the second LIN partition 106. A payload of the Ethernet frame may include the LIN header 128 of the read request or the LIN header 128 and LIN response 130 of the write request. The proxy slave 114 in the second LIN partition 106 may then send the Ethernet frame over the Ethernet network to the proxy master 118 in the first LIN partition 104 which recovers the payload tunneled over the Ethernet network. Further, for a read request, the proxy master 118 may send the LIN response 130 associated with the read request over the backbone communication network in a backbone communication message to the proxy slave 114. In examples, the proxy master 118 may form the backbone communication message as an Ethernet frame destined to the proxy slave 114 in the first LIN partition 104 which sent the read request over the backbone communication network 102. In examples, the payload of the Ethernet frame may include the LIN response 130 of the read request. The proxy master 118 in the second LIN partition 104 may then send the Ethernet frame over the Ethernet network to the proxy slave 114 in first LIN partition 104. The proxy slave 114 may recover the LIN response 130 from the payload tunneled over the Ethernet network and send the LIN response 130 over the data path 116 for receipt by the originating master 108.

The originating master 108 in the first LIN partition 104 may not know for a read request that a slave associated with the read request may be located in the second LIN partition 106. If the slave is located in the second LIN partition 106, any added latency by (i) the proxy slave 114 sending the LIN header 128 to proxy master 118 over the backbone communication network 102; (ii) the proxy master 118 sending LIN header 128 over the data path 124; (iii) the slave in the second LIN partition 106 sending the LIN response 130 to the proxy master 118; (iv) the proxy master 118 sending the LIN response 130 to the proxy slave 114 over the backbone communication network 102; and (v) the proxy slave 114 sending the LIN response 130 to the originating master 108 in the first LIN partition 104 may violate the LIN response time 133. The violation is due to the latency of sending the messages through the backbone communication network 102.

Various embodiments are directed to anticipating the read request from the originating master and the proxy slave 114 of the first LIN partition 104 storing a copy of the data associated with the slaves of the second LIN partition 106 to reduce a response time of the read request sent by the originating master 108 of the first LIN partition 104. This way the proxy slave 114 does not need to obtain from the slaves in the second LIN partition 106 the data to be read when the read request is received and violate the LIN response time 133. Instead, the proxy slave 114 responsively provides the data associated with the read request which it already stores when the read request is received to the originating master 108.

To facilitate the proxy slave 114 storing the copy of the data which is associated with the slaves of the second LIN partition 106, the proxy master in the second LIN partition stores a basic read schedule table (BRST) 134 in memory. The BRST 134 may have a plurality of entries, an example of which is shown as entry 136. An entry in the BRST has a designation R to indicate data to be read from a slave in the second LIN partition 106 and, in examples, the entry may include a LIN message identifier. To illustrate, entry 136 may be associated with LIN message identifier 1, and other entries may be associated with LIN message identifiers 2-4. In examples, the entries in the BRST 134 may match data to be read by the originating master 108 in the first LIN partition 104 or in a same order as the data to be read by the originating master 108 in the first LIN partition 104 based on firmware running on one or more of the originating master 108 and the proxy master 118.

The proxy master 118 may read the data indicated by the BRST 134 by sending a read request in the form of a LIN header with a LIN message identifier in an entry of the BRST 134. A slave on the second LIN partition 106 which subscribes to the LIN message identifier sends a LIN response with the data. Then, the proxy master 118 forwards the LIN response with the data and an indication of the LIN message identifier associated with the received data. The LIN response and indication is forwarded via the backbone communication network 102 to the proxy slave 114 which stores a copy of the data.

The proxy slave 114 may store the read data in memory as an example table 138. In examples, the table 138 may be a data structure such as an array or linked list. The example table 138 may associate the LIN message identifier with the data that was read based on the LIN message identifier. Each row in the example table 138 may have an entry for each column 142-144. Column 142 may define a LIN message identifier. Column 144 may indicate a type of the LIN message identifier by the designation R corresponding to read data and store data associated with the read. In this regard as an example, row 148 may indicate that for LIN message identifier ($ID_1$) read data associated with LIN message identifier ($ID_1$) is stored. In some examples, the proxy master 118 may only forward the received data to the proxy slave 114 if the data is different from data associated with the LIN message identifier which was previously forwarded to the proxy slave 114. Then, if the originating master 108 in the first LIN partition 104 sends a read request with the LIN message identifier subscribed to by a slave in a second LIN partition 106, the proxy slave 114 accesses the table 138 based on the LIN message identifier to determine the row associated with the LIN message identifier. The data associated with the LIN identifier in the table 138 is provided to originating master 108 because it already stores the data associated with the read request. The proxy master does not have to obtain the data from the slave in the second LIN partition 106 when the read request is received. The BRST 134 allows the proxy master 118 to anticipatorily read the data in the slaves in the second LIN partition 106 and provide the data to the proxy slave 114. As a result, when the originating master 108 in the first LIN partition 104 sends the read request, the originating master 108 in the first LIN partition 104 receives the data from the proxy slave 114 within the LIN response time 133 even though the data was provided by a slave of the second LIN partition 106.

In some examples, the originating master 108 in the first LIN partition 104 may send a write request with a LIN message identifier subscribed to by a slave in a second LIN partition while the proxy master 118 is performing read requests in accordance with the BRST 134. The proxy slave 114 may send the write request to the proxy master 118 over the backbone communication network 102. The BRST 134 may be modified to form BRST 140 with a write slot designed by W when the proxy master 118 receives the write request. The proxy master 118 stops issuing the read requests and sends the write request indicated by the BRST 140. The slave in the second LIN partition 106 which subscribes to the LIN message identifier in the write request performs a write operation associated with the write request. The proxy master 118 then continues the read requests associated with the BRST 140. In this regard, the proxy master 118 may be able perform the read requests defined by the BRST 134 even when the originating master 108 sends write requests.

In examples, operations of the BRST 134 may be performed independent of any read request from the originating master 108. This way the proxy slave 114 does not need to obtain from the slaves in the second LIN partition 106 the data to be read when the read request is received. Instead, the proxy slave 114 responsively provides the data associated with the read request which it already stores when the read request is received to the originating master 108, reducing or preventing violations in the LIN response time 133. The BRST 134 may allow the proxy master 118 to anticipate the data read by the originating master 108. Further, in examples, the BRST 134 may be arranged as a circular buffer of LIN message identifiers. In examples, the proxy master 118 sends read requests associated with each LIN message identifier in each entry of the BRST 134, and then repeats sending each read request again to obtain new or updated data from a slave in the second LIN partition 106 which is then provided to the proxy slave 114.

Figure 2:
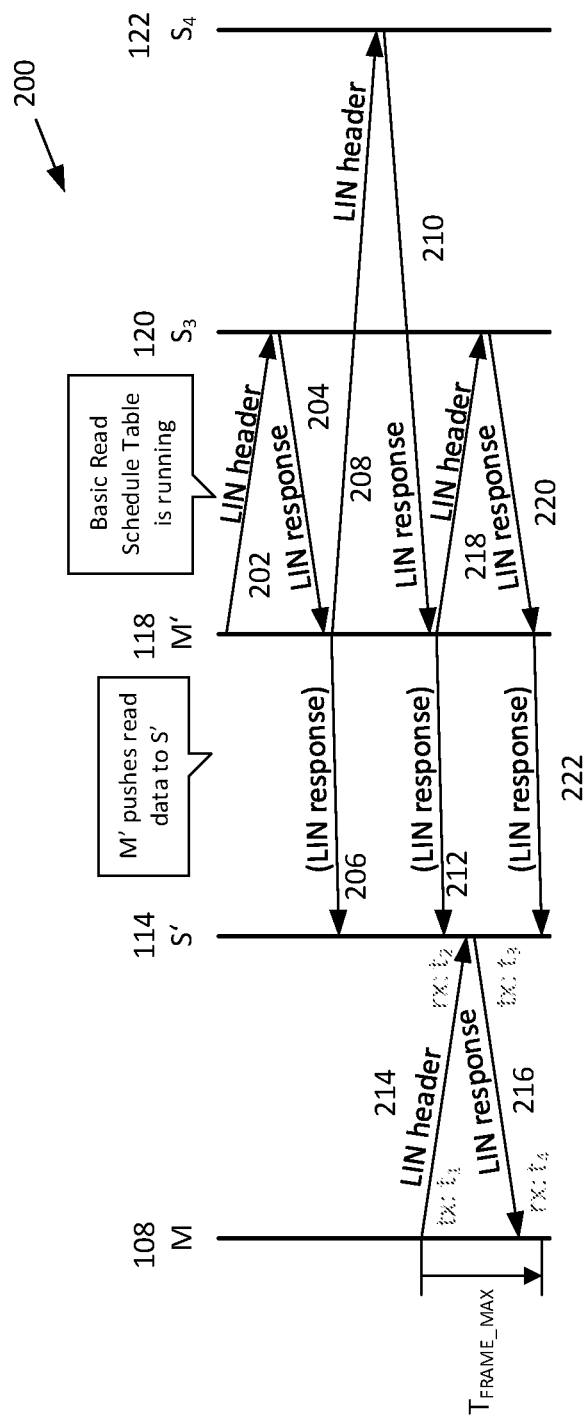
FIG. 2 is an example message flow and timing which illustrates a master in a first LIN partition sending the read request with a LIN message identifier subscribed to by a slave in a second LIN partition and where a proxy master in the second LIN partition is performing read requests in accordance with a basic read schedule table (BRST).

FIG. 2 is a message flow which illustrates a master in a first LIN partition sending a read request in the form of a LIN header with a LIN message identifier subscribed to by a slave in a second LIN partition when a proxy master in the second LIN partition is performing read requests in accordance with a basic read schedule table (BRST). Messages 202-212 may be associated with BRST operation.

To read data, the proxy master 118 may send a LIN header 202 with a LIN message identifier which is subscribed to by slave $S_3$ in the second LIN partition 106. The slave $S_3$ in the second LIN partition may provide the data in the LIN response 204 to the proxy master 118. In turn, the proxy master 118 may provide the LIN response 204 and the LIN message identifier from LIN header 202 to the proxy slave 114 in a backbone communication message 206 sent over the backbone communication network 102. In examples, the backbone communication network 102 may tunnel messages between the first LIN partition 104 and the second LIN partition 106. The proxy slave 114 may then store the data associated with the LIN response 204 in the table 138. The proxy master 118 may send additional read requests in accordance with the BRST. The proxy master 118 may send a LIN header 208 with a LIN message identifier subscribed to by slave $S_4$ in the second LIN partition 106. The slave $S_4$ in the second LIN partition 106 may provide the data in the LIN response 210 to the proxy master 118. In turn, the proxy master 118 may provide in a backbone communication network message 212 the LIN response 210 to the proxy slave 114. In response, the proxy slave 114 may store the data associated with the LIN response 210 in the table 138.

This process may be repeated for each slave again in accordance with the BRST 134. Additionally, this process may be repeated for a same slave as shown by messages 218, 220, 222.

The operations performed by the proxy slave 114 and proxy master 118 may anticipate the originating master 108 in the first LIN partition 104 performing a read request in the form a LIN header with a LIN message identifier subscribed to by a slave in the second LIN partition 106.

Messages 214-216 may be messages associated with a read request by the originating master 108. At $t_1$, the originating master 108 in the first LIN partition 104 may send a LIN header 214 with a LIN message identifier subscribed to by a slave in the second LIN partition 106. At $t_2$, the proxy slave 114 which receives the LIN header may be arranged to provide the data in a LIN response 216 by accessing the table 138 which stores the data associated with the LIN message identifier in the LIN header 214. At $t_3$, the proxy slave may be arranged to send the LIN response 216 with the data associated with the LIN message identifier in the LIN header 214 which is received by the originating master 108 at $t_4$. The time for the originating master 108 to receive the response may be less than a maximum time of a LIN response time 133 or $t_4-t_1 < T_{FRAME\_MAX}$ even though the slave associated with the read request was located in a different LIN partition from the originating master 108. In examples, the LIN response space 133 time is satisfied.

Figure 3:
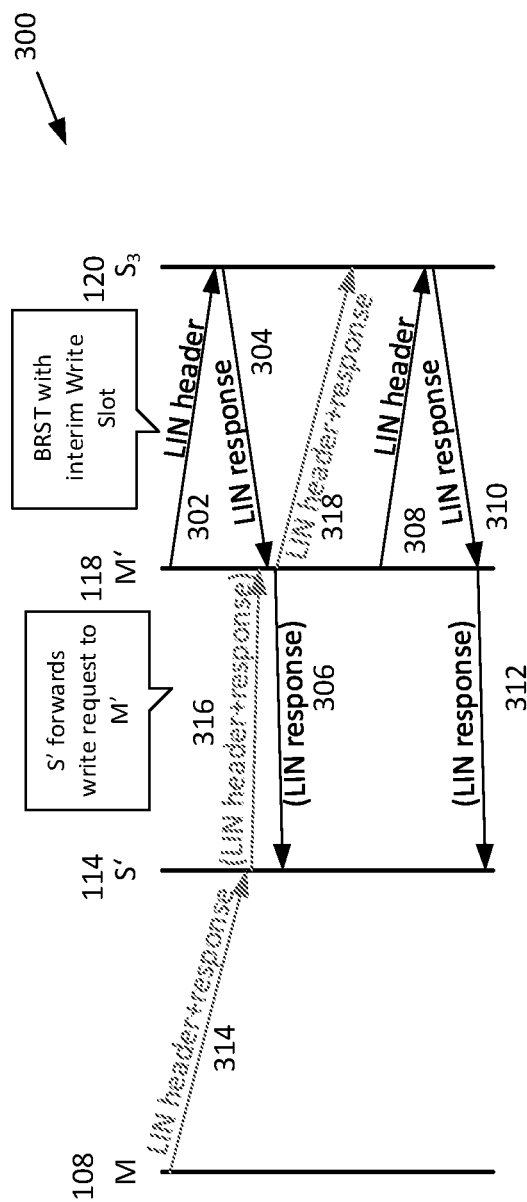
FIG. 3 is an example message flow and timing which illustrates the master in the first LIN partition sending a write request with a LIN message identifier subscribed to by a slave in the second LIN partition and where the proxy master is forwarding the write request and performing the read requests in accordance with the BRST.

FIG. 3 is a message flow 300 which illustrates the originating master 108 in the first LIN partition sending a write request with a LIN message identifier subscribed to by a slave in the second LIN partition when the proxy master 118 is performing read requests in accordance with the BRST 134. The proxy master 118 may interrupt the read requests performed in accordance with the BRST 134 to perform the write request from the originating master 108. Messages 302-312 may be associated with the read requests performed in accordance with the BRST 134. The messages may include LIN headers and LIN responses between the proxy master 118 and slave $S_3$ along with LIN responses from the proxy master 118 and the proxy slave 114. The messages result in the proxy slave 114 storing data from slave $S_3$ in the table 138.

While the proxy master 118 is performing read requests in accordance with the BRST 134, the originating master 108 in the first LIN partition 104 may send a write request in the form of a LIN header with a LIN message identifier subscribed to by a slave in the second LIN partition 106. Messages 314-318 may be associated with this write request. The write request may include both the LIN header and the LIN response where the LIN header has a LIN message identifier subscribed to by $S_3$ in the second LIN partition 106. The originating master 108 may send a message 314 with the write request to the proxy slave 114. The proxy slave 114 may forward message 316 with the write request to the proxy master 118 over the backbone communication network 102. In examples, messages may be tunneled between the first LIN partition 104 and the second LIN partition 106. The proxy master 118 may be performing read requests by sending a LIN header to the slave $S_3$ and then receiving a LIN response from the slave $S_3$. The proxy master 118 may add a write slot to the BRST 134 (forming BRST 140) by delaying a read request and sending a message 318 with the write request to the slave $S_3$ which causes the slave $S_3$ in the second LIN partition 106 to complete the write request. Then, the proxy master 118 may continue sending the read request associated with message 308. Based on the message flow 300, the proxy master 118 may perform read requests in accordance with the BRST even when the originating master 108 in the first LIN partition 104 sends a write request with a message identifier subscribed to by a slave in the second LIN partition 106.

An event-triggered frame (ETF) enables a master to obtain data from one or more LIN slaves in a second LIN partition 106. In examples, the master sends the ETF and slaves that subscribe to the ETF and have data will respond to the ETF. So long as there is no response collision as discussed below, the ETF is a faster way to obtain data instead of individually polling the slaves in the second LIN partition 106.

The ETF may take the form of a LIN header specified in ISO 17987-3 LIN header having a LIN message identifier which indicates that the LIN header is associated with an ETF. If a LIN slave receives the ETF, subscribes to the LIN message identifier, and has new or updated data associated with the LIN message identifier, then the LIN slave responds to the master with the new or updated data in a LIN response. If the LIN slave receives the ETF and does not have new or updated data, then the LIN slave does not respond to the master with new or updated data in a LIN response. In this regard, different scenarios are possible when a master sends an ETF. If none of the LIN slaves respond to an ETF sent by the master, then a response times out. If one LIN slave responds to the ETF sent by the master, then the master receives new or updated data without error in a LIN response. If more than one LIN slave responds to the ETF sent by the master with a respective LIN response, then a collision occurs between the LIN responses results and needs to be resolved. The resolution may be for a master to poll each of the slaves with new or updated data individually to obtain the new or updated data without collision in respective LIN responses.

Figure 4:
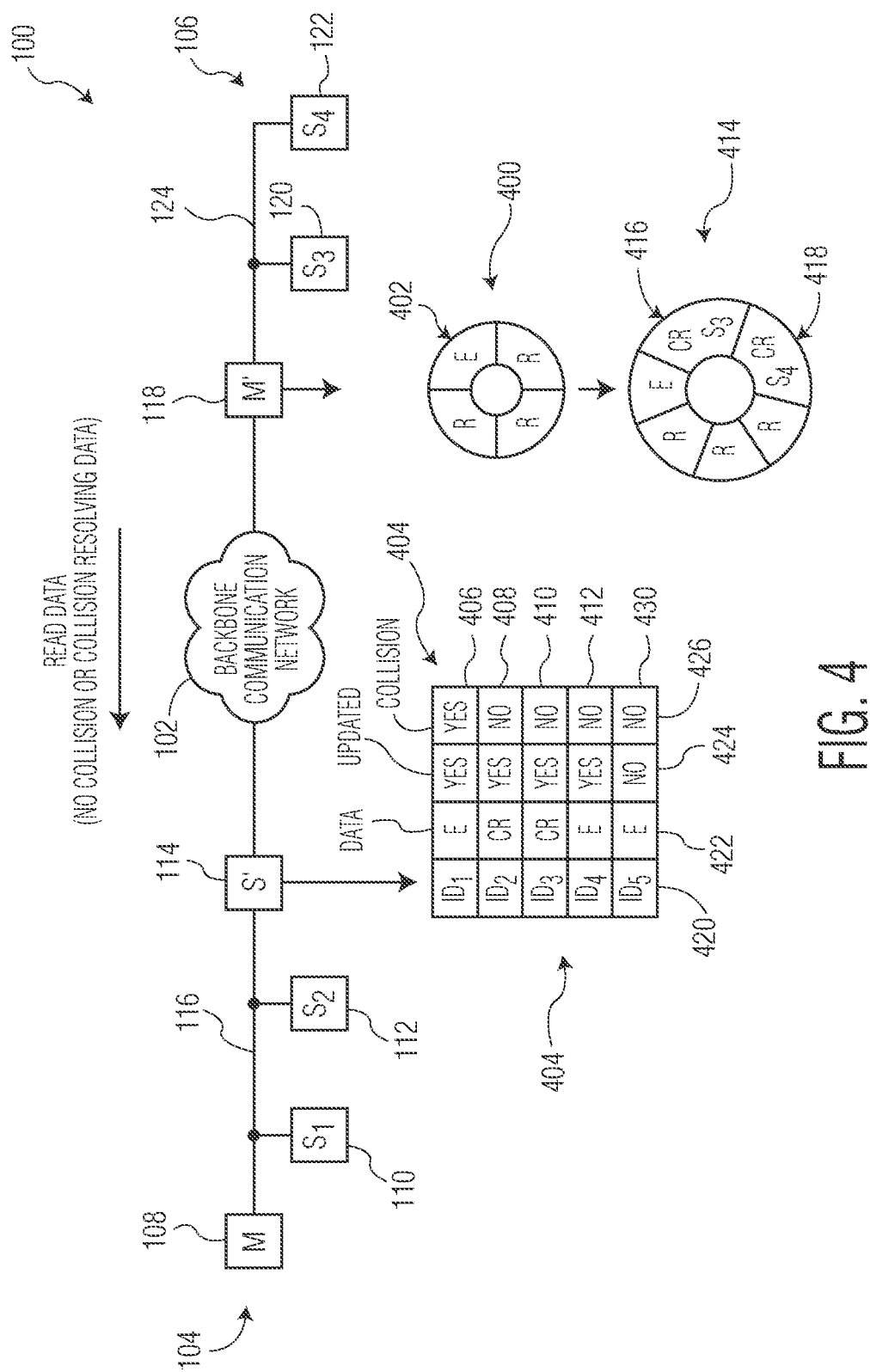
FIG. 4 is an example system diagram of the divided LIN which is split via the backbone communication network into different LIN partitions and configured to support Event Triggered Frames (ETF).

FIG. 4 is a system diagram of the divided LIN 100 which is split via a backbone communication network 102 and configured to support an ETF. The divided LIN 100 has the first LIN partition 104 and the second LIN partition 106. The first LIN partition 104 has the originating master 108 and one or more slaves 110, 112 coupled together via the data path 116. To facilitate communication between LIN partitions 104, 106, the proxy slave 114 of the first LIN partition 104 and the proxy master 118 in the second LIN partition 106 are coupled to the backbone communication network 102. The proxy master 118 in the second LIN partition 106 is then coupled to one or more other slaves 120, 122 via the data path 124. The proxy slave 114 in the first LIN partition 104 is the proxy slave to the other slaves 120, 122 in the second LIN partition 106. The originating master 108 in the first LIN partition 104 may not know that a slave which subscribes to an ETF is located in the second LIN partition 106. If the slave is located in the second LIN partition 106, any added latency by the proxy slave 114 sending an ETF in the form of an LIN header (ETF) over the backbone communication network 102 and receiving a LIN response may cause a violation in the LIN response time 133.

To reduce or prevent the violations in the LIN response time 133, the proxy master 118 may be arranged with a BRST in memory which is modified with an event triggered read slot shown as slot 402 with the designation E to form an event triggered schedule table (ETST) 400. The event triggered read slot may define an ETF. The proxy master 118 may send the ETF. If none of the LIN slaves subscribe to the ETF, then a response times out and no new or updated data is received by the proxy master 118.

If one slave responds to the ETF, then the new or updated data is received by the proxy master 118 without error in a LIN response. The proxy master 118 pushes this data and the associated LIN message identifier to the slave proxy 114 over the backbone communication network 102 in a backbone communication message with the LIN response.

If more than one slave respond to the ETF sent by the proxy master 118, then a collision occurs between the LIN responses and needs to be resolved. The resolution may be for the proxy master 118 to modify the ETST 400 to produce ETST 414 with one or more collision resolving read slots 416, 418 designated by CR to poll each of the identified slaves involved in the collision with new or updated data individually. As shown, read slot 416 may be associated with a LIN message identifier subscribed to by slave 120 and read slot 418 may be associated with a LIN message identifier subscribed to by slave 122. The polling may be based on the proxy master 118 sending a plurality of read requests one at a time and receiving respective responses to the read requests. A read request may have a LIN message identifier subscribed to by one of the slaves involved in the collision which allows for receiving the data from the one of the slaves in LIN responses. The read request may take the form of a LIN header (CR). The proxy master 118 sends the plurality of LIN header (CR) each with different LIN message identifiers so that each of the slaves responds with data without collision. The proxy master 118 pushes the LIN responses with the data resulting from the polling to the proxy slave 114 over the backbone communication network 102 as a backbone communication message. The backbone communication message may also include an indication that the ETF resulted in a collision and the respective LIN message identifier used to read each of the data from the polled slaves.

The proxy slave 114 may be arranged with an example table 404 in memory to store the received data. The example table 404 has one or more rows with a plurality of entries in one or more columns. As shown, the example table 404 has one or more rows 406, 408, 410, 412, 430 and one or more columns 420, 422, 424, 426. Each row may have a plurality of entries associated with the columns 420, 422, 424, 426. The column 420 may specify a LIN message identifier. The column 422 may be associated with whether the LIN message identifier is associated with an ETF designated by "E" or a collision resolution slot designated by "CR." Column 424 may indicate whether data associated with the LIN message identifier is updated and to be provided to the originating master 108. Column 426 may indicate whether the LIN message identifier is associated with a collision.

To illustrate, row 406 may define an identifier $ID_1$ which may be the LIN message identifier in column 420. Row 406 may also have a designation E which is short for an ETF in column 422 and which indicates that $ID_1$ is associated with an ETF. Row 406 may have a designation of updated in column which indicates that data associated with ID1 is updated and to be provided to the originating master 108. Row 406 may also have a designation in column 426 that the $ID_1$ is associated with a collision. As another example, row 408 may define an identifier $ID_2$ which may be the LIN message identifier in column 420. Row 408 may also have a designation CR which is short for a collision resolution slot in column 422 and which indicates that $ID_2$ is associated with data resulting from a polling a slave as part of an ETF. Row 408 may have a designation of updated in column which indicates that data associated with $ID_2$ is updated and to be provided to the originating master 108. Row 408 may also have a designation in column 426 that the $ID_2$ is not associated with a collision.

In examples, a LIN message identifier with an E designation as a row entry in column 422 may indicate that a LIN message identifier is associated with an ETF. The row entry may also point to the LIN message identifiers of CR slots associated with the ETF. For instance, $ID_1$ associated with an ETF may have a pointer (not shown) to point to $ID_2$ and $ID_3$. $ID_1$ is an ETF which resulted in a collision and $ID_2$ and $ID_3$ are LIN message identifiers associated with polling slaves to obtain the data associated with the collision. In some examples, the row of a LIN message identifier associated with the ETF may not have entries in column 424, 426 to indicate whether the ETF is associated with a collision, updated data, or a combination thereof. Instead, the proxy slave 114 may determine whether a collision is associated with the ETF or whether the ETF is associated with updated data based on information of the CR slots associated with the ETF. For instance, if none of the LIN message identifiers associated with the CR slots have updated data, then the LIN message identifier associated with the ETF is not associated with a collision. As another example, if one of the LIN message identifiers associated with the CR slots have updated data, then then the LIN message identifier associated with the ETF is not associated with a collision. As another yet example, if two or more of the LIN message identifiers associated with the CR slots have updated data, then the LIN message identifier associated with the ETF is associated with a collision.

The proxy slave 114 may use the table 404 to handle an ETF received from the originating master 108 reducing violation of the LIN response time 133. In examples, the table 404 may store the data associated with the ETF before the proxy slave 114 receives the ETF from the originating master 108. The proxy slave 114 does not have to obtain the data from the slave in the second LIN partition 106 when the ETF from the originating master 108 is received.

For example, if the proxy slave 114 receives an ETF with a LIN message identifier that matches a LIN message identifier in row 430, then the proxy slave 114 may determine if the data is associated with the ETF is updated. If it is not updated, then the data has previously sent to the originating master 108 and the proxy slave 114 provides no LIN response based on row 430.

As another example, if the proxy slave 114 receives an ETF with a LIN message identifier that matches a LIN message identifier in row 412, then the proxy slave 114 may determine that the data is associated with the ETF is updated and not associated with a collision. The proxy slave 114 provides the data of row 412 in a LIN response and the indication of the updated data is changed to indicate that the data was provided to the originating master 108.

As yet another example, if the proxy slave 114 receives an ETF that matches a message identifier in row 406, then the proxy slave 114 may determine that the data associated with the ETF is updated and associated with a collision. The proxy slave 114 provides a LIN response with an error, e.g., no checksum 131, to cause the originating master 108 to poll the slaves to read the updated data. The originating master 108 may send read requests with the LIN message identifiers to read the data from each of the slaves in the form of a LIN header (CR). For example, the proxy slave 114 may receive a LIN header (CR), access one of the row 408, 410 in the table 404 associated with the LIN message identifier in the LIN header (CR), and provide the data associated with one of the rows 408, 410 as a LIN response to the read request. The data may be provided in the LIN response time and the indication of the updated data is set to "No" to indicate that the data was provided to the master 114. This process is repeated by the originating master 108 for each of the slaves which would be involved in the collision. This way the originating master 108 may perform an ETF as if the slaves were in a same LIN partition and the LIN response time 133 is not violated.

In examples, the data resulting from the proxy master 118 polling the slaves 120, 122 may be provided from the proxy master 118 to the proxy slave 114 in a single network frame such as a single Ethernet frame over the backbone communication network 102. The single network frame allows the proxy slave 114 to receive the polled data together and not as separate network frames. By receiving the polled data together, the table 404 may be updated with all the polled data together. If the data is sent via separate network frames, the table 404 may be updated piecemeal as network frames with the polled data are received. In turn, data which does not reflect what is on a slave but which is stored in the table 404 might be provided to the originating master 108 in response to the ETF from the originating master 108.

In examples, the proxy master 118 may perform operations of the ETST 400, 414 may independent from any ETF from the originating master 108. This way the proxy slave 114 does not obtain the data to be read from the slaves in the second LIN partition 106 when the ETF from the originating master 108 is received and violate the LIN response time 133. Instead, the proxy slave 114 responsively provides the data associated with the ETF to the originating master 108, which it already stores when the proxy slave 114 receives ETF. The ETST 400, 414 may allow the proxy master 118 to anticipate the data read by the originating master 108. Further, in examples, the ETST 400, 414 may be arranged as a circular buffer of LIN message identifiers. In examples, the proxy master 118 sends ETFs associated with each LIN message identifier in each entry of the ETST 400, 414, and after data is received from the slaves in the second LIN partition 106 repeats sending each ETF again to obtain new or updated data from a slave in the second LIN partition 106 which is then provided to the proxy slave 114.

Figure 5:
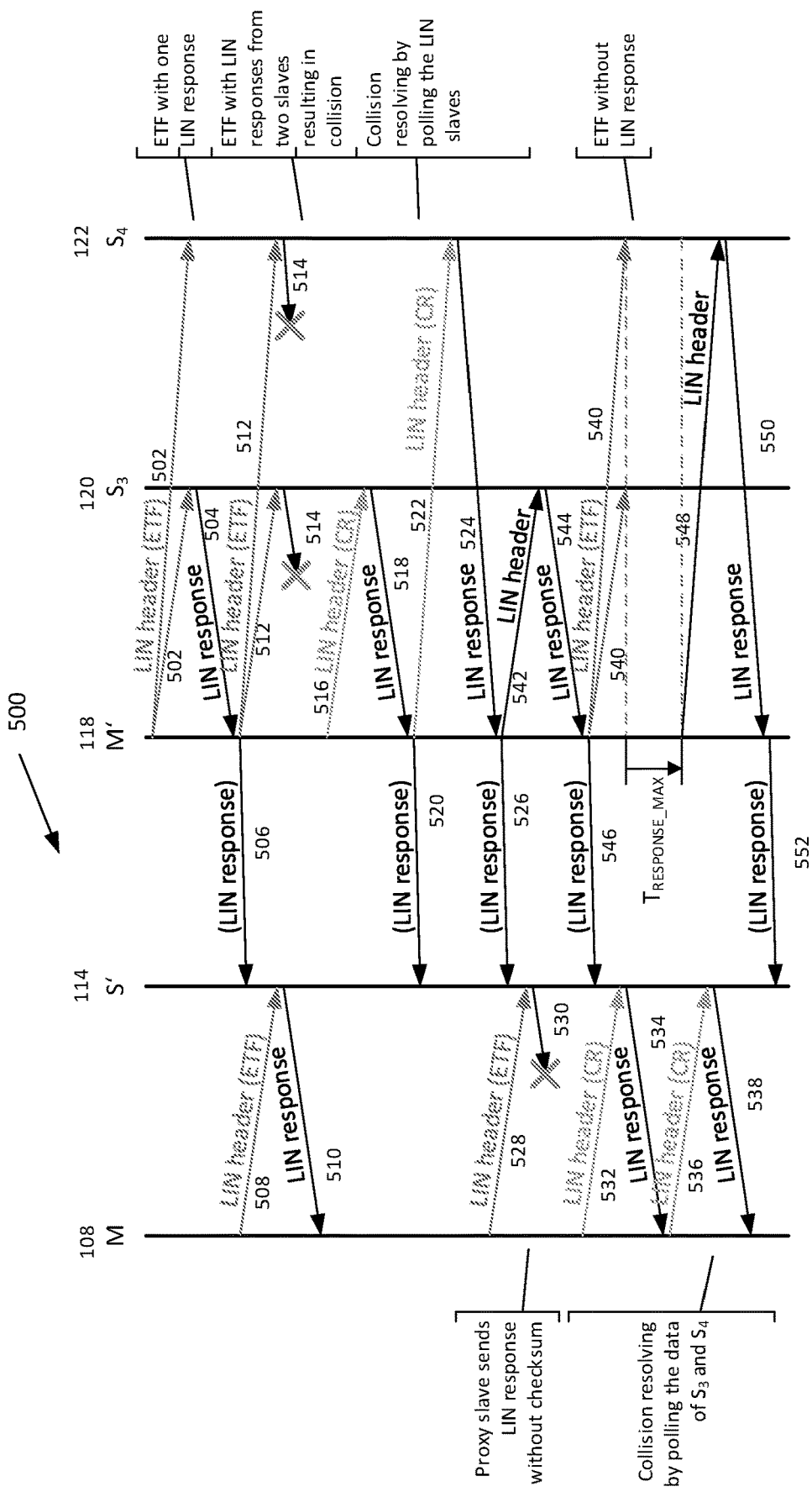
FIG. 5 is an example message flow and timing which illustrates the master in the first LIN partition sending an ETF with a LIN message identifier subscribed to by slaves in the second LIN partition and where the proxy master is sending ETFs in accordance with an event triggered schedule table (ETST).

FIG. 5 illustrates various message flows 500 associated with an originating master in a first LIN partition 104 sending an ETF with a LIN message identifier subscribed to by slaves in a second LIN partition 106 and a proxy master 118 in the second LIN partition 106 sending an ETF in accordance with the ETST 400, 414. LIN responses may be received in response to the ETFs.

Messages 502-510 may be associated with an ETF sent by the proxy master 118 when there is no collision. Proxy master 118 may send the ETF in the form of a LIN header (ETF) 502 which is subscribed to by slave 120 and slave 122. Slave 120 may send a LIN response 504 which is forwarded to the proxy slave 114 over the backbone communication network 102 as a backbone communication message 506. In examples, messages may be tunneled between the first LIN partition 104 and the second LIN partition 106. The proxy slave 114 may use the LIN response 506 to complete a row in the table 404. Then, when an originating master 108 sends a LIN header (ETF) 508 to the proxy slave 114 for the data, the proxy slave 114 may respond with the data in a LIN response 510.

Messages 512-538 may be associated with an ETF sent by the proxy master 118 when there is collision. Proxy master 118 may send the ETF in the form of a LIN header (ETF) 512 which is subscribed to by slave 120 and slave 122. Slave 120 may send a LIN response 514 and slave 122 may send a LIN response 514 which collide. The collision may be indicated by unintelligible information on the data path such as a LIN response with no checksum 131. The proxy master 118 may perform collision resolving reads to receive the data from slaves 120, 122. The collision resolution is shown by messages 516-518 indicative of read requests to the slaves and then the proxy master 118 then forwards the LIN response 518 to the proxy slave by backbone communication message 520 for entry of the data associated with the LIN response 518 in the table 404. In some examples, the proxy master 118 may only forward the received data to the proxy slave 114 if the data is different from data associated with the LIN message identifier which was previously forwarded to the proxy slave 114. The collision resolution is also shown by messages 522-524 indicative of read requests to the slaves and then the LIN response 524 is forwarded to the proxy slave by backbone communication message 526 for entry of the data associated with the LIN response 524 in the table 404. In some examples, the proxy master 118 may send the LIN response 520 and LIN response 526 to the proxy slave 114 in an single network frame (such as a single Ethernet frame) with the received data from the slaves 120, 122 and LIN message identifiers used by the proxy master 118 to receive the data rather than separate LIN responses.

The proxy slave 114 may use the one or more LIN responses to complete rows in the table 404. Then, when the originating master 108 sends ETF with a LIN message identifier subscribed to by a slave 120, 122, then the proxy slave 114 may respond with data based on the table 404. The table 404 may indicate that the data associated with the LIN message identifier was involved in a collision. When the originating master sends an ETF in the form of LIN header (ETF) 528 to obtain data from the slaves which subscribe to an LIN message identifier, the proxy slave 114 may indicate the collision to the originating master 108 by a LIN response 530 with errored checksum 131, for example. The errored checksum 131 may cause the originating master 108 to then poll each of the slaves associated with the LIN message identifier with read requests as shown by messaging 532-538.

Message 540 may be associated with an ETF sent by the proxy master 118 when there no response to ETF. The proxy master 118 may send the ETF in the form of a LIN header (ETF) 540 with a LIN message identifier subscribed to by slaves 120, 122. The proxy slave 118 may not receive a response to the LIN header (ETF) 540 during a period of time $T_{response\_max}$ which indicates that neither slave has data to provide in a respective LIN response.

In examples, the LIN header (ETF) may be interleaved with read requests associated with a BRST of the proxy master 118. Messages 542, 544, 546 and 548, 550, 552 are examples. The proxy slave 114 may receive data and store the data in a table 138.

In some examples, the ETST may not be configured with a ETF slot. Instead, the ETST may be configured with only collision resolving read slots CR associated with an ETF for polling each of the slaves in the second LIN partition 106. In this regard, the proxy master 118 may send messages 516, 522 and the proxy master 118 may not be arranged to send LIN header (ETF) messages such as 502, 512, 540. If no updated data is received as a result of the polling, then no data is pushed to the slave proxy 114 over the backbone communication network 102. If a LIN response is received from one slave, then the proxy master 120 pushes the LIN response to the slave proxy 114 over the backbone communication network 102 and associated data is indicated in the table 404 as received without collision. If a LIN response is received from more than one slave, then the proxy master 120 pushes the LIN response to the slave proxy 114 over the backbone communication network 102 and data associated with the LIN response is indicated in the table 404 as received with collision even though no collision was actually generated in the second LIN partition 106. In some examples, the LIN responses from the more than one slave and LIN message identifiers used by the proxy master 118 to receive the LIN responses is provided as a single network frame (such as a single Ethernet frame).

In some examples, the proxy master 118 may send an ETF associated with a given LIN message identifier and receive a LIN response from one slave such as $S_3$ without collision. The LIN response may be sent to the proxy slave 114 and the proxy slave 114 stores the data associated with the LIN response in a row of the table 404 along with the LIN message identifier used to receive the LIN response. Then, if the originating master 108 sends an ETF associated with the given LIN message identifier, then the proxy slave 114 sends a LIN response with the data from $S_3$ in the row of the table 404 and changes the updated entry for the row in the table 404 to indicate that the data was provided to the originating master 108. In examples, the proxy master 118 may send another ETF associated with the given LIN message identifier before the originating master 108 requests the data from $S_3$ stored in the row of the table 404. This other ETF may result in the proxy master 120 sending data from $S_4$ only to the proxy slave 114 such that the proxy slave 114 has updated data from both $S_3$ and $S_4$. The proxy slave 114 stores data from $S_4$ in another row of the table 404 associated with the given LIN message identifier used to receive the data. In this case, the proxy slave 114 has to indicate a collision to the ETF associated with the given LIN message identifier even though LIN responses from $S_3$ or $S_4$ itself with respective data are not associated with a collision. The proxy slave 114 may be arranged to examine the received data associated with the given LIN message identifier, e.g., using ternary content addressable memory (TCAM), and update the table 404 so that the received data is associated with a collision shown by rows 406-410 of table 404, for example. In this way, the proxy slave 114 is able to indicate a collision to the originating master 108 when the ETF associated with the given LIN message identifier is received from the originating master 108.

Example Operation

Figure 6:
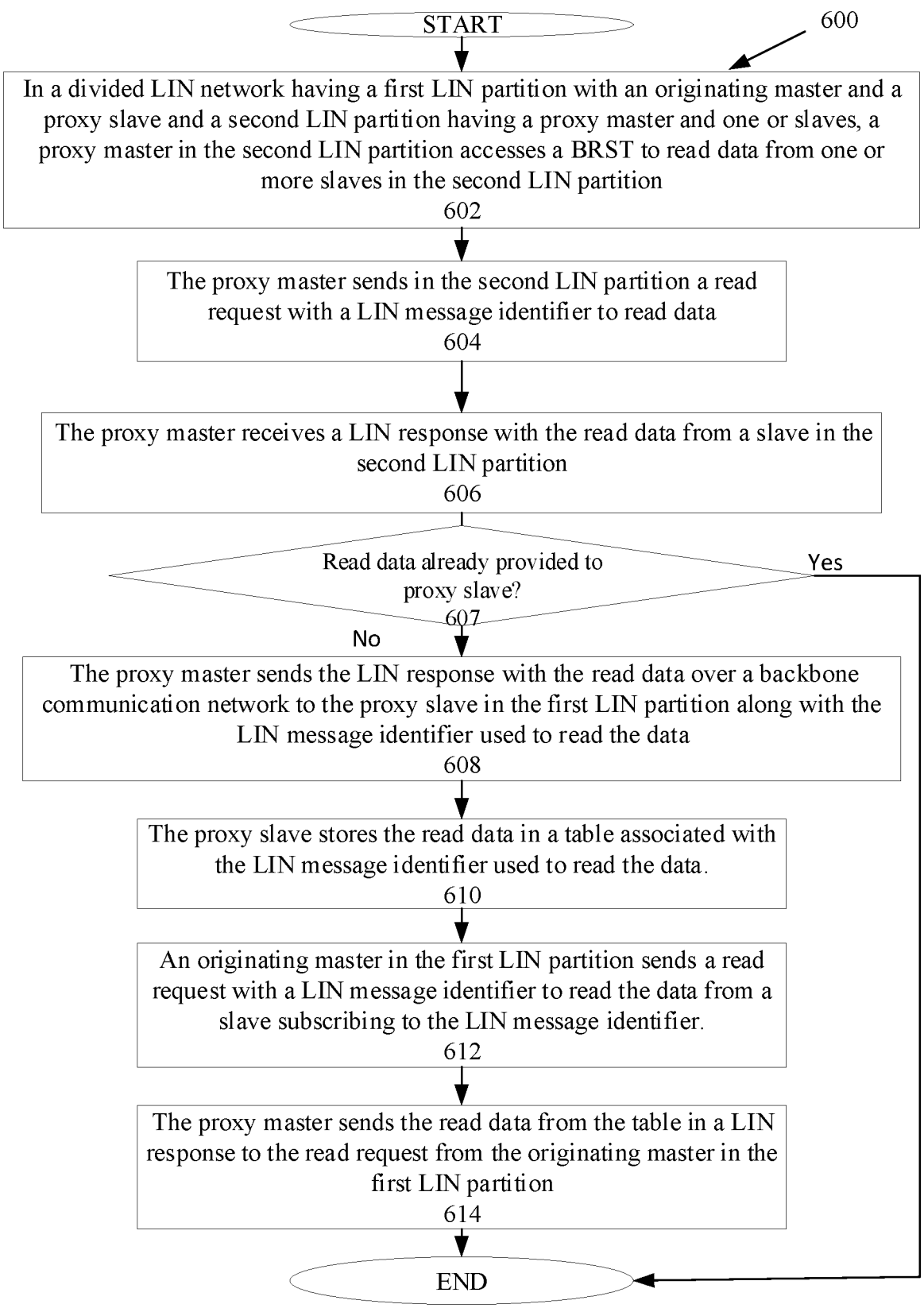
FIG. 6 is an example flow chart of functions associated with a master in one LIN partition sending a read request to read data from slaves in another LIN partition which reduces or prevents violations in a LIN response time of LIN message frames.

FIG. 6 is a flow chart of functions 600 associated with an originating master in a first LIN partition sending a read request to read data from slaves in a second LIN partition which reduces or prevents violations in the LIN response time of LIN message frames. The functions 600 may be performed by one or more of the originating master 108, the proxy slave 114, the proxy master 118, and the slaves of the LIN network 100. In examples, a function of the functions 600 may be implemented using circuitry such as analog circuitry, mix signal circuitry, memory circuitry, logic circuitry, processing circuitry that executes code stored in a memory that when executed by the processing circuitry perform the disclosed functions, or combinations thereof.

At 602, in a divided LIN having a first LIN partition with an originating master and a proxy slave and a second LIN partition having a proxy master and one or slaves, a proxy master in the second LIN partition accesses a BRST to read data from one or more slaves in the one LIN partition. The BRST may have one or more read request slots for reading data from the slaves in the one LIN partition. In examples, the one LIN partition may refer to the LIN partition 106 described above.

At 604, the proxy master sends in the second LIN partition a read request with a LIN message identifier to read data. The LIN message identifier may cause a slave in the second LIN partition provide read data.

At 606, the proxy master receives a LIN response with the read data from a slave in the second LIN partition.

At 607, a determination is made whether the read data was already provided to a proxy slave. In examples, if data associated with the LIN response was already provided to the proxy slave, then the LIN response with the read data is duplicative and is not provided to the proxy slave to reduce communications over the backbone network and processing ends. In other examples, step 607 may be not be performed and read data from the slave is provided to the proxy slave regardless if it is duplicative.

At 608, the proxy master sends the LIN response with the read data over a backbone communication network to the proxy slave in the first LIN partition along with the LIN message identifier used to read the data. The LIN response and the LIN message identifier may be sent in a backbone communication message over the backbone communication network. In examples, the second LIN partition may refer to the LIN partition 104 described above.

At 610, the proxy slave stores the read data in a table associated with the LIN message identifier used to read the data.

At 612, an originating master in the first LIN partition sends a read request with a LIN message identifier to read the data from a slave subscribing to the LIN message identifier. The slave may be in the one LIN partition.

At 614, the proxy slave sends the read data from the table in a LIN response to the read request from the originating master in the first LIN partition. The LIN response is sent in the LIN response time 133 even though the read data was from a slave in the second LIN partition accessed via the backbone communication network 102.

Figure 7:
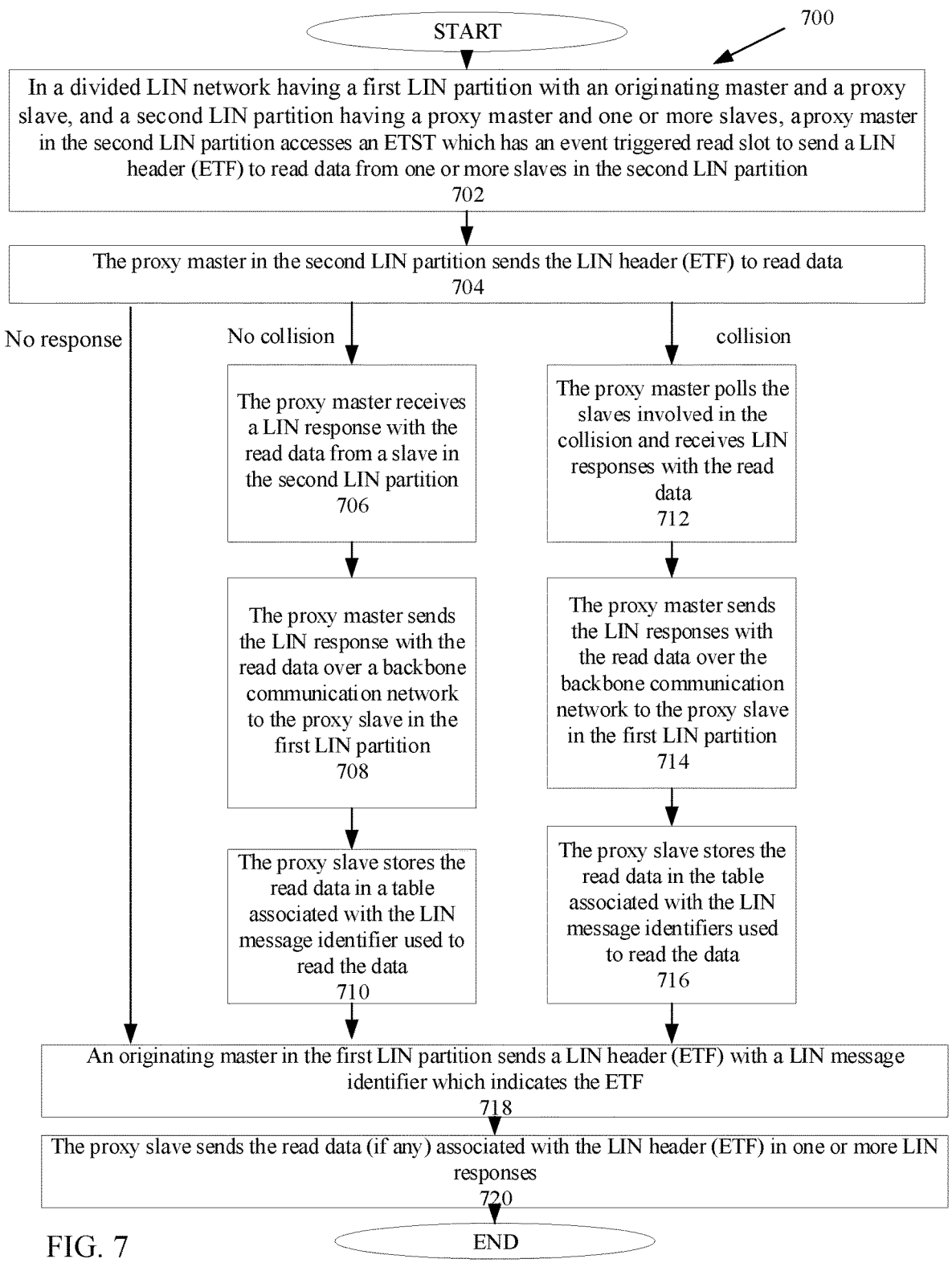
FIG. 7 is an example flow chart of functions associated with a master in one LIN partition sending an ETF to read data from slaves in another LIN partition which reduces or prevents violations in the LIN response time of LIN message frames.

FIG. 7 is a flow chart of functions 700 associated with an originating master in a first LIN partition sending an ETF in the form of a LIN header (ETF) to read data from slaves in a second LIN partition which reduce violations in the LIN response time of LIN message frames. The functions 700 may be performed by one or more of the originating master 108, the proxy slave 114, the proxy master 118, and slaves of the LIN network 100. In examples, a function of the functions 700 may be implemented using circuitry such as analog circuitry, mix signal circuitry, memory circuitry, logic circuitry, processing circuitry that executes code stored in a memory that when executed by the processing circuitry perform the disclosed functions, or combinations thereof.

At 702, in a divided LIN having a first LIN partition with an originating master and a proxy server, and a second LIN partition having a proxy master and one or slaves, a proxy master in the second partition accesses an ETST which has an event triggered frame with a read slot to send a LIN header (ETF). The LIN header (ETF) is used to read data from one or more slaves in one LIN partition. In examples, the second LIN partition may refer to the LIN partition 106 described above.

At 704, the proxy master in the second LIN partition sends the LIN header (ETF) to read data. The ETF may have a LIN message identifier which indicates the ETF. The ETF in the form of a LIN header (ETF) results in no slaves sending LIN responses with the read data, one slave sending LIN responses with the read data, or more than one slave sending LIN responses with the read data.

If one slave sends a LIN response, then then there is no collision. Processing continues to blocks 706-710.

At 706 the proxy master receives from a slave in the one LIN partition the LIN response with the read data if there is no collision resulting from the LIN header (ETF).

At 708, the proxy master sends the LIN response with the read data together with the associated LIN message identifier over a backbone communication network to the proxy slave in the first LIN partition as a backbone communication message. In examples, the first LIN partition may refer to LIN partition 104 described above.

At 710, the proxy slave stores the read data associated with the LIN response in the table 404 associated with the LIN message identifier used to read the data. Because the read data is associated with a LIN header (ETF) that did not result in a collision, the table 404 may store an indication that the read data is not associated with a collision indicated by row 412 for example.

If more than one slave sends LIN responses, then there is a collision with the ETF. Processing continues to blocks 712-716. At 712 the proxy master polls the slaves involved in the collision with read requests for the read data and receives the read data. The read requests for polling may take the form of a LIN header (CR) with a LIN message identifier of the slave being polled and the read data received in LIN responses. The slaves may be polled in accordance with a collision resolving schedule which identifies the slaves associated with the ETF to poll and in a specific order during a collision. At 714, the proxy master sends the LIN responses with the read data resulting from the polling and the associated LIN message identifier to the proxy slave in the first LIN partition in a backbone communication message. At 716, the proxy slave stores the read data associated with the LIN responses in the table 404 associated with the LIN message identifier used to read the data. Example storage is indicated by rows 410-412 for example. The table 404 may also store an indication that the read data is associated with a collision of the ETF indicated by row 406, for example.

If no slave sends read data in response to the ETF at 704, then processing continues to block 718. Similarly, processing continues to block 718 from blocks 706-710 associated with no collision and blocks 712-716 associated with a collision.

At 718, an originating master in the first LIN partition sends a LIN header (ETF) with a LIN message identifier which indicates an ETF and slaves that subscribe to the ETF.

At 720, the proxy slave sends the read data (if any) associated with the LIN header (ETF) in a LIN response. A manner by which proxy slave sends the read data may depend on whether there was a collision associated with the read data of the ETF. The collision may be indicated in the table 404. If there was no collision for the LIN message identifier indicated by row 412 in the table 404 for example, then the proxy slave sends the read data in a LIN response to the originating master 108 in the first LIN partition. The LIN response is sent in the LIN response time 133 even though the read data is associated with a slave in the second LIN partition. If there was a collision for the LIN message identifier indicated by row 406 in the table 404 for example, then the proxy slave sends a LIN response without a checksum 131 to simulate a collision to the originating master 108. This causes the originating master 108 to then send in accordance with a collision resolving schedule used by the proxy master 118 read requests to each of slaves. A read request may be a LIN header (CR) with LIN message identifier which identifies the respective slave to poll. The proxy slave provides the LIN responses in accordance with the read requests based on the data stored in the table 404 indicated by rows 410-412, for example. The LIN responses are sent in the LIN response time 133 even though the read data is stored in a slave in the one LIN partition. If there is no data associated with the LIN header (ETF), then no data is provided in response to the ETF.

As discussed above, in some examples, the ETST may not be configured with a ETF slot. Instead, the ETST may be configured with only collision resolving read slots CR associated with an ETF for polling each of the slaves in the second LIN partition 106. In this regard, one or more of steps 712, 714, 716 may be only performed instead of the proxy master sending a LIN header (ETF).

Example Apparatus

Figure 8:
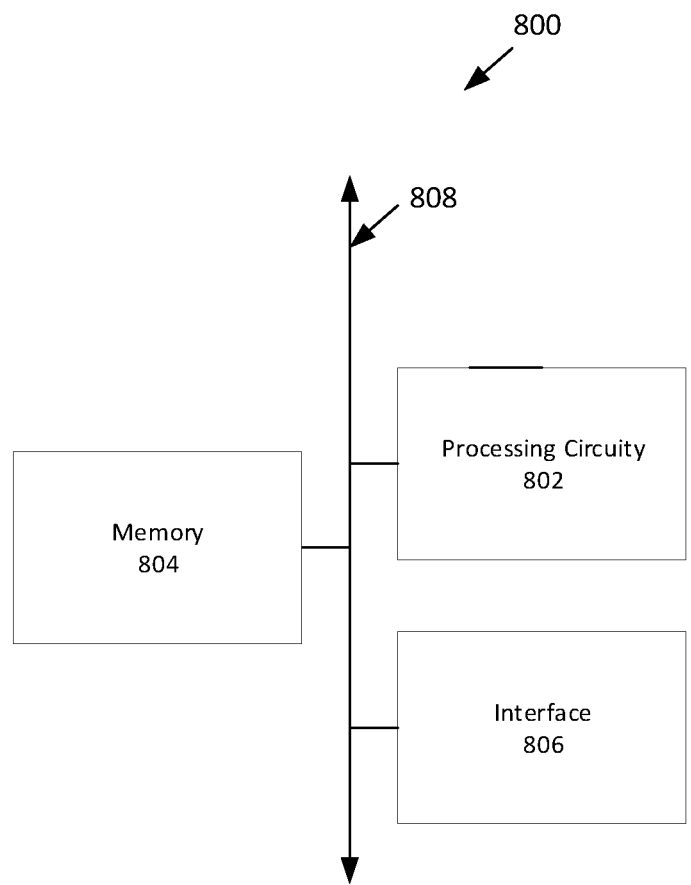
FIG. 8 is an example block diagram of the proxy master or proxy slave configured to support the read requests and the write requests.

FIG. 8 is a block diagram of the proxy master or proxy slave, referred to generally as a network device 800 configured to support the functions as described herein. The network device 800 may have processing circuitry 802 (possibly including multiple processors, multiple cores, multiple nodes, and/or implementing multi-threading, etc.) and memory 804 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium. The memory 804 may store computer code, program instructions, computer instructions, program code for performing one or more operations or control of operations associated the network device 800 as described above. Further, the memory 804 may store one or more of the BRST or ETST in a proxy master for reading data as described above or the example table 138, 404 in a proxy slave for storing the data received from other slaves. The network device 800 also includes an interconnect 808 such as a bus (e.g., PCI, ISA, PCI-Express) which couples the processing circuitry 802, the memory 804, and one or more interfaces shown as interface 806. The interface 806 may facilitate sending and receiving read requests and write requests over the data path 116, 124 and backbone communication network 102. The network device 800 may include other components as well.

In one embodiment, a method is disclosed in a divided local interconnect network (LIN) comprising a first LIN partition and a second LIN partition separated by a communication network. The method comprises receiving, by a proxy slave in the first LIN partition, data from a proxy master in the second LIN partition, wherein a slave in the second LIN partition sends the data to the proxy master, the proxy master sends the data to the proxy slave over the communication network, and the proxy slave is a proxy to the slave in the second LIN partition; storing, by the proxy slave, the data in a data structure; receiving, by the proxy slave, a read request from an originating master in the first LIN partition after the data is stored in the data structure, wherein the read request comprises a LIN message identifier subscribed to by the slave in the second LIN partition and the proxy master is a proxy to the originating master; accessing, by the proxy slave, the data stored in the data structure based on the LIN message identifier in the read request; and sending, by the proxy slave, a LIN response to the originating master with the stored data from the slave in the second LIN partition. In an embodiment, the data is first data, the read request is a first read request, and the LIN response is a first LIN response, the method further comprises: sending, by the proxy master, a second read request, the second read request being sent to the slave in the second LIN partition, wherein the second read request anticipates the first read request; receiving, from the slave in the second LIN partition, a second LIN response, the second LIN response being sent to the proxy master based on a LIN message identifier in the second read request; sending, by the proxy master, in a communication message the second LIN response to the proxy slave in the first LIN partition over the communication network; and receiving, by the proxy slave, second data for storage in the data structure of the proxy slave, the second data being associated with the second LIN response. In an embodiment, the method further comprises determining whether the second data associated with the second LIN response was already sent to the proxy slave and not sending the communication message to the proxy slave if the second data was already sent. In an embodiment, the method further comprises receiving, by the proxy slave from the originating master, a write request; sending, by the proxy slave, the write request over the communication network to the proxy master; delaying, by the proxy master, the second read request; and sending, by the proxy master, the write request to the slave in the second LIN partition. In an embodiment, the data is first data and the LIN response is a first LIN response, the method further comprises sending, by the proxy master, a first event triggered frame (ETF); receiving, from the slave in the second LIN partition, a second LIN response, the second LIN response being sent responsive to the first ETF; sending, by the proxy master, in a communication message the second LIN response to the proxy slave over the communication network; storing, by the proxy slave, second data in the data structure, the second data being associated with the second LIN response and including an indication that the second data was received without a collision; and receiving, by the proxy master, a second ETF from the originating master to read the second data after the second data is stored in the data structure. In an embodiment, the data is first data; wherein the slave in the second LIN partition is a first slave; and wherein the second LIN partition comprises a second slave, the method further comprises always polling, by the proxy master, each of the first slave and the second slave for a respective LIN response associated with a first ETF subscribed to by the first slave and the second slave; sending, by the proxy master, in a communication message the respective LIN response from one or more of the first slave and the second slave to the proxy slave via the communication network; storing, by the proxy slave, second data in the data structure, the second data being associated with the respective LIN response for each of the first slave and the second slave and including an indication that the second data is associated with a collision if the communication message comprises the respective response from the first slave and the second slave, and receiving, by the proxy master, a second ETF from the originating master to read the second data after the second data is stored in the data structure. In an embodiment, the method of sending, by the proxy master, the respective LIN response to the proxy slave via the communication network comprises sending, by the proxy master, the respective LIN response for each of the first slave and the second slave to the proxy slave in a single Ethernet frame sent over the communication network. In an embodiment, the method further comprises accessing, by the proxy slave, the data structure to read the second data based on the second ETF; determine, by the proxy slave, that the second data is associated with a collision based on the indication in the data structure; and sending, by the proxy slave, a second LIN response to the second ETF which does not have a valid checksum, the second LIN response causing the originating master to poll for the second data.

In another embodiment, a system is disclosed. The system comprises a proxy slave in a first local interconnect network (LIN) partition; a proxy master in a second LIN partition; a communication network which couples the first LIN partition and the second LIN partition; the proxy master implemented with circuitry to send data to the proxy slave, wherein a slave in the second LIN partition sends the data to the proxy master and the proxy master sends the data to the proxy slave over the communication network; and the proxy slave implemented with circuitry to receive the data from the proxy master; wherein the proxy slave is a proxy to the slave in the second LIN partition; store the data in a data structure; receive a read request from an originating master in the first LIN partition after the data is stored in the data structure, wherein the read request comprises a LIN message identifier subscribed to by the slave in the second LIN partition and the proxy master is a proxy to the originating master; accessing the data stored in the data structure based on the LIN message identifier in the read request; and send a LIN response to the originating master with the stored data from the slave in the second LIN partition. In an embodiment, the proxy slave in the first LIN partition is implemented with circuitry to send the LIN response within a LIN response time after the read request is received. In an embodiment, the data is first data, the read request is a first read request, and the LIN response is a first LIN response, the system further comprises: the proxy master implemented with circuitry to send a second read request, the second read request being sent to the slave in the second LIN partition, wherein the second read request anticipates the first read request; receive from the slave in the second LIN partition, a second LIN response, the second LIN response being sent to the proxy master based on a LIN message identifier in the second read request; and send in a communication message the second LIN response to the proxy slave in the first LIN partition over the communication network; and the proxy slave implemented with circuitry to receive second data for storage in the data structure of the proxy slave, the second data being associated with the second LIN response. In an embodiment, the system further comprises the proxy slave implemented with circuitry to receive a write request from the originating master; and send the write request over the communication network to the proxy master; and the proxy master implemented with circuitry to delay the second read request; and send the write request to the slave in the second LIN partition. In an embodiment, the data is first data and the LIN response is a first LIN response, the system further comprises the proxy master implemented with circuitry to send a first event triggered frame (ETF); receive from the slave in the second LIN partition a second LIN response, the second LIN response being sent in response to the first ETF; send in a communication message the second LIN response to the proxy slave over the communication network; and the proxy slave implemented with circuitry to store second data, the second data being associated with the second LIN response and including an indication that the second data was received without a collision, and receive a second ETF from the originating master to read the second data after the second data is stored in the data structure. In an embodiment, the data is first data; wherein the slave in the second LIN partition is a first slave; and wherein the second LIN partition comprises a second slave, the system further comprises the proxy master implemented with circuitry to always poll each of the first slave and the second slave for a respective LIN response associated with a first ETF subscribed to by the first slave and the second slave; and send in a communication message the respective LIN response from one or more of the first slave and the second slave to the proxy slave via the communication network; and the proxy slave implemented with circuitry to store second data in the data structure, the second data being associated with the respective LIN response for each of the first slave and the second slave and including an indication that the second data is associated with a collision if the communication message comprises the respective response from the first slave and the second slave; and receive, by the proxy master, a second ETF from the originating master to read the second data after the second data is stored in the data structure. In an embodiment, the proxy master is implemented with circuitry to send the respective LIN response to the proxy slave via the communication network comprises the proxy master implemented with circuitry to send the respective LIN response from each of the first slave and the second slave to the proxy slave in a single Ethernet frame sent over the communication network. In an embodiment, the proxy slave is implemented with circuitry to access the data structure to read the second data based on the second ETF; determine that the second data is associated with a collision based on the indication in the data structure; and send a second LIN response to the second ETF which does not have a valid checksum, the second LIN response causing the originating master to poll for the second data.

In yet another embodiment, a proxy slave is disclosed. The proxy slave comprises: first circuitry arranged to receive data from a proxy master in a LIN partition coupled to a communication network, wherein a slave in the LIN partition sends the data to the proxy master, the proxy master sends the data to the proxy slave over the communication network, and the proxy slave is a proxy to the slave in the LIN partition; second circuitry arranged to store the data in a data structure; third circuitry arranged to receive, by the proxy slave, after the data is stored in the data structure a read request from an originating master in a LIN partition different from the LIN partition with the slave and the proxy master, wherein the read request comprises a LIN message identifier subscribed to by the slave in the LIN partition and the proxy master is a proxy to the originating master; fourth circuitry arranged to access the data stored in the data structure based on the LIN message identifier in the read request; and fifth circuitry arranged to send a LIN response to the originating master with the stored data from the slave in the second LIN partition. In an embodiment, the data structure comprises an association between the LIN message identifier and the data. In an embodiment, the data is first data; wherein the slave in the LIN partition is a first slave; and wherein the LIN partition comprises a second slave, the proxy slave further comprises sixth circuitry arranged to receive a respective LIN response associated with each of the first slave and the second slave in a single Ethernet frame sent over the communication network. In an embodiment, the data is first data; and wherein the LIN response is a first LIN response, the proxy slave further comprises sixth circuitry arranged to receive an ETF subscribed to by the first slave and the second slave from the originating master, access the data structure for second data based on a LIN message identifier associated with the ETF, determine that the second data is associated with a collision between the first slave and the second slave, wherein the data structure indicates that the LIN message identifier associated with the ETF and the second data are associated with the collision; and send a second LIN response which does not have a valid checksum, the second LIN response causing the originating master to poll for the second data.

In another embodiment, a proxy master is disclosed. The proxy master comprises: first circuitry arranged to send a read request to a slave in a LIN partition, wherein the read request anticipates a read request sent by an originating master in another LIN partition coupled to the LIN partition by a communication network and the proxy master is a proxy to the originating master; second circuitry arranged to receive from the slave in the LIN partition a LIN response, the LIN response being sent to the proxy master based on a LIN message identifier in the second read request; and third circuitry arranged to send in a communication message the second LIN response to a proxy slave in the other LIN partition over the communication network, wherein the proxy slave is a proxy to the proxy slave in the LIN partition. In an embodiment, the read request sent by the originating master is sent to the proxy slave. In an embodiment, a schedule table indicates LIN message identifiers associated with data to be read from one or more additional slaves in the LIN partition, wherein the LIN message identifiers match LIN message identifiers in read requests sent by the originating master to read the data from the one or more additional slaves. In an embodiment, the schedule table is arranged as a circular buffer of the LIN message identifiers; and wherein the proxy master comprises fourth circuitry arranged to send a respective read request associated with each of the LIN message identifiers, receive a respective LIN response from the one or more additional slaves, send the respective LIN response to the proxy slave, and repeat the sending of the respective read request associated with each of the LIN message identifiers, receiving of the respective LIN response, the sending of the respective LIN response to the proxy slave to obtain new data from the one or more additional slaves.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Further, the term "table", "BRST", or "ETST" as described herein refers generally to a data structure for storage of information and may take many forms including an array or linked list.

Other implementations fall within the scope of the following claims.

What is claimed is:

1. In a divided local interconnect network (LIN) comprising a first LIN partition and a second LIN partition separated by a communication network, a method comprising:
   receiving, by a proxy slave in the first LIN partition, data from a proxy master in the second LIN partition, wherein a slave in the second LIN partition sends the data to the proxy master, the proxy master sends the data to the proxy slave over the communication network, and the proxy slave is a proxy to the slave in the second LIN partition;
   storing, by the proxy slave, the data in a data structure;
   receiving, by the proxy slave, a read request from an originating master in the first LIN partition after the data is stored in the data structure, wherein the read request comprises a LIN message identifier subscribed to by the slave in the second LIN partition and the proxy master is a proxy to the originating master;
   accessing, by the proxy slave, the data stored in the data structure based on the LIN message identifier in the read request; and
   sending, by the proxy slave, a LIN response to the originating master with the stored data from the slave in the second LIN partition.

2. The method of claim 1, wherein the data is first data, the read request is a first read request, and the LIN response is a first LIN response, the method further comprising:
   sending, by the proxy master, a second read request, the second read request being sent to the slave in the second LIN partition, wherein the second read request anticipates the first read request;
   receiving, from the slave in the second LIN partition, a second LIN response, the second LIN response being sent to the proxy master based on a LIN message identifier in the second read request;
   sending, by the proxy master, in a communication message the second LIN response to the proxy slave in the first LIN partition over the communication network; and
   receiving, by the proxy slave, second data for storage in the data structure of the proxy slave, the second data being associated with the second LIN response.

3. The method of claim 2, further comprising determining whether the second data associated with the second LIN response was already sent to the proxy slave and not sending the communication message to the proxy slave if the second data was already sent.

4. The method of claim 2, further comprising receiving, by the proxy slave from the originating master, a write request; sending, by the proxy slave, the write request over the communication network to the proxy master; delaying, by the proxy master, the second read request; and sending, by the proxy master, the write request to the slave in the second LIN partition.

5. The method of claim 1, wherein the data is first data and the LIN response is a first LIN response, the method further comprising sending, by the proxy master, a first event triggered frame (ETF); receiving, from the slave in the second LIN partition, a second LIN response, the second LIN response being sent responsive to the first ETF; sending, by the proxy master, in a communication message the second LIN response to the proxy slave over the communication network; storing, by the proxy slave, second data in the data structure, the second data being associated with the second LIN response and including an indication that the second data was received without a collision; and receiving, by the proxy master, a second ETF from the originating master to read the second data after the second data is stored in the data structure.

6. The method of claim 1, wherein the data is first data; wherein the slave in the second LIN partition is a first slave; and wherein the second LIN partition comprises a second slave, the method further comprising always polling, by the proxy master, each of the first slave and the second slave for a respective LIN response associated with a first ETF subscribed to by the first slave and the second slave; sending, by the proxy master, in a communication message the respective LIN response from one or more of the first slave and the second slave to the proxy slave via the communication network; storing, by the proxy slave, second data in the data structure, the second data being associated with the respective LIN response for each of the first slave and the second slave and including an indication that the second data is associated with a collision if the communication message comprises the respective LIN response from the first slave and the second slave, and receiving, by the proxy master, a second ETF from the originating master to read the second data after the second data is stored in the data structure.

7. The method of claim 6, wherein sending, by the proxy master, the respective LIN response to the proxy slave via the communication network comprises sending, by the proxy master, the respective LIN response for each of the first slave and the second slave to the proxy slave in a single Ethernet frame sent over the communication network.

8. The method of claim 6, further comprising accessing, by the proxy slave, the data structure to read the second data based on the second ETF; determining, by the proxy slave, that the second data is associated with a collision based on the indication in the data structure; and sending, by the proxy slave, a second LIN response to the second ETF which does not have a valid checksum, the second LIN response causing the originating master to poll for the second data.

9. A system comprising:
a proxy slave in a first local interconnect network (LIN) partition;
a proxy master in a second LIN partition;
a communication network which couples the first LIN partition and the second LIN partition;

the proxy master implemented with circuitry to send data to the proxy slave, wherein a slave in the second LIN partition sends the data to the proxy master and the proxy master sends the data to the proxy slave over the communication network; and
the proxy slave implemented with circuitry to receive the data from the proxy master; wherein the proxy slave is a proxy to the slave in the second LIN partition; store the data in a data structure; receive a read request from an originating master in the first LIN partition after the data is stored in the data structure, wherein the read request comprises a LIN message identifier subscribed to by the slave in the second LIN partition and the proxy master is a proxy to the originating master; accessing the data stored in the data structure based on the LIN message identifier in the read request; and send a LIN response to the originating master with the stored data from the slave in the second LIN partition.

10. The system of claim 9, wherein the proxy slave in the first LIN partition is implemented with circuitry to send the LIN response within a LIN response time after the read request is received.

11. The system of claim 9, wherein the data is first data, the read request is a first read request, and the LIN response is a first LIN response, the system further comprising:
the proxy master implemented with circuitry to send a second read request, the second read request being sent to the slave in the second LIN partition, wherein the second read request anticipates the first read request; receive from the slave in the second LIN partition, a second LIN response, the second LIN response being sent to the proxy master based on a LIN message identifier in the second read request; and send in a communication message the second LIN response to the proxy slave in the first LIN partition over the communication network; and
the proxy slave implemented with circuitry to receive second data for storage in the data structure of the proxy slave, the second data being associated with the second LIN response.

12. The system of claim 9, further comprising the proxy slave implemented with circuitry to receive a write request from the originating master; and send the write request over the communication network to the proxy master; and the proxy master implemented with circuitry to delay the second read request; and send the write request to the slave in the second LIN partition.

13. The system of claim 9, wherein the data is first data and the LIN response is a first LIN response, the system further comprising the proxy master implemented with circuitry to send a first event triggered frame (ETF); receive from the slave in the second LIN partition a second LIN response, the second LIN response being sent in response to the first ETF; send in a communication message the second LIN response to the proxy slave over the communication network; and the proxy slave implemented with circuitry to store second data, the second data being associated with the second LIN response and including an indication that the second data was received without a collision, and receive a second ETF from the originating master to read the second data after the second data is stored in the data structure.

14. The system of claim 9, wherein the data is first data; wherein the slave in the second LIN partition is a first slave; and wherein the second LIN partition comprises a second slave, the system further comprising the proxy master implemented with circuitry to always poll each of the first slave and the second slave for a respective LIN response associated with a first ETF subscribed to by the first slave and the second slave; and send in a communication message the respective LIN response from one or more of the first slave and the second slave to the proxy slave via the communication network; and the proxy slave implemented with circuitry to store second data in the data structure, the second data being associated with the respective LIN response for each of the first slave and the second slave and including an indication that the second data is associated with a collision if the communication message comprises the respective LIN response from the first slave and the second slave; and receive, by the proxy master, a second ETF from the originating master to read the second data after the second data is stored in the data structure.

15. The system of claim 14, wherein the proxy master implemented with circuitry to send the respective LIN response to the proxy slave via the communication network comprises the proxy master implemented with circuitry to send the respective LIN response from each of the first slave and the second slave to the proxy slave in a single Ethernet frame sent over the communication network.

16. The system of claim 14, further comprising the proxy slave implemented with circuitry to access the data structure to read the second data based on the second ETF; determine that the second data is associated with a collision based on the indication in the data structure; and send a second LIN response to the second ETF which does not have a valid checksum, the second LIN response causing the originating master to poll for the second data.

17. A proxy slave comprising:
processing circuitry;
interface;
memory; and
a bus which couples the processing circuitry, the interface circuitry, and the memory;
the interface arranged to receive data from a proxy master in a LIN partition coupled to a communication network, wherein a slave in the LIN partition sends the data to the proxy master and the proxy master sends the data to the proxy slave over the communication network, wherein the proxy slave is a proxy to the slave in the LIN partition;
the processing circuitry arranged to store the data in a data structure the data structure further stored in the memory;
the interface arranged to receive after the data is stored in the data structure a read request from an originating master in a LIN partition different from the LIN partition with the slave and the proxy master, wherein the read request comprises a LIN message identifier subscribed to by the slave in the LIN partition and the proxy master is a proxy to the originating master;
the processing circuitry arranged to access the data stored in the data structure based on the LIN message identifier in the read request; and
the interface arranged to send a LIN response to the originating master with the stored data from the slave in the second LIN partition.

18. The proxy slave of claim 17, wherein the data structure comprises an association between the LIN message identifier and the data.

19. The proxy slave of claim 17, wherein the data is first data; wherein the slave in the LIN partition is a first slave; and wherein the LIN partition comprises a second slave, the interface arranged to receive a respective LIN response associated with each of the first slave and the second slave in a single Ethernet frame sent over the communication network.

20. The proxy slave of claim 17, wherein the data is first data; and wherein the LIN response is a first LIN response, the interface arranged to receive an ETF subscribed to by the first slave and the second slave from the originating master; the processing circuitry arranged to access the data structure for second data based on a LIN message identifier associated with the ETF, determine that the second data is associated with a collision between the first slave and the second slave, wherein the data structure indicates that the LIN message identifier associated with the ETF and the second data are associated with the collision; and the interface arranged to send a second LIN response which does not have a valid checksum, the second LIN response causing the originating master to poll for the second data.

21. A proxy master comprising:
an interface arranged to send a read request to a slave in a LIN partition, wherein the read request anticipates a second read request sent by an originating master in another LIN partition coupled to the LIN partition by a communication network and the proxy master is a proxy to the originating master; receive from the slave in the LIN partition a LIN response, the LIN response being sent to the proxy master based on a LIN message identifier in the read request; and send in a communication message the LIN response to a proxy slave in the another LIN partition over the communication network, wherein the proxy slave is a proxy to the proxy slave in the LIN partition.

22. The proxy master of claim 21, wherein the read request sent by the originating master is sent to the proxy slave.

23. The proxy master of claim 21, further comprising a memory arranged to store a schedule table which indicates LIN message identifiers associated with data to be read from one or more additional slaves in the LIN partition, wherein the LIN message identifiers match LIN message identifiers in read requests sent by the originating master to read the data from the one or more additional slaves.

24. The proxy master of claim 23, where the schedule table is arranged as a circular buffer of the LIN message identifiers; and wherein the interface is arranged to send a respective read request associated with each of the LIN message identifiers, receive a respective LIN response from the one or more additional slaves, send the respective LIN response to the proxy slave, and repeat the sending of the respective read request associated with each of the LIN message identifiers, receiving of the respective LIN response, the sending of the respective LIN response to the proxy slave to obtain new data from the one or more additional slaves.

* * * * *